| United States Patent [19] | [11] | 4,413,107 |
| --- | --- | --- |
| Locatelli | [45] | Nov. 1, 1983 |

[54] IMIDO THERMOSETTING COMPOSITIONS STORAGE-STABILIZED AGAINST RECRYSTALLIZATION OF BIS-IMIDES THEREFROM

[75] Inventor: Jean-Louis Locatelli, Vienne, France

[73] Assignee: Rhone-Poulenc Industries, Paris, France

[21] Appl. No.: 232,253

[22] Filed: Feb. 6, 1981

Related U.S. Application Data

[63] Continuation of Ser. No. 223,715, Jan. 9, 1981, abandoned.

[30] Foreign Application Priority Data

Jan. 9, 1980 [FR] France ................................ 80 00369

[51] Int. Cl.$^3$ ............................................. C08F 26/06
[52] U.S. Cl. .................................... 526/262; 524/548; 525/47; 525/169; 525/445; 528/322
[58] Field of Search ........................ 526/262; 528/322; 525/47, 169, 445; 524/602, 606, 548

[56] References Cited

U.S. PATENT DOCUMENTS 4,298,720  11/1981  Yamazaki et al. .................. 526/262

Primary Examiner—Harold D. Anderson
Attorney, Agent, or Firm—Burns, Doane, Swecker & Mathis

[57] ABSTRACT

Thermosetting compositions comprising an N,N'-diphenylene-bis-imide of an unsaturated carboxylic acid and at least one non-imido comonomer copolymerizable therewith, are storage-stabilized against recrystallization of the bis-imide therefrom, by formulating same in the presence of a recrystallization preventing amount of an N,N'-toluene-bis-maleimide.

The resultant compositions are useful solventless casting resins; also as coating/impregnating compositions.

11 Claims, No Drawings

IMIDO THERMOSETTING COMPOSITIONS STORAGE-STABILIZED AGAINST RECRYSTALLIZATION OF BIS-IMIDES THEREFROM

CROSS-REFERENCE TO RELATED APPLICATION

This is a continuation of my copending application, Ser. No. 223,715, filed Jan. 9, 1981 now abandoned, assigned to the assignee hereof and hereby expressly incorporated by reference and relied upon.

BACKGROUND OF THE INVENTION

1. Field of the Invention

The present invention relates to storage-stable thermosetting compositions comprising bis-imides of unsaturated carboxylic acids.

2. Description of the Prior Art

The copolymerization of bis-imides of unsaturated carboxylic acids with comonomers which can be polymerized by free-radical or ionic initiation, and yielding heat-stable polymers upon curing under the influence of heat, is known to this art. As a general rule, these polymers are prepared by homogenizing the various constituents by melting/intimately admixing same at moderate temperatures, in a first stage, and then, in a second stage, and after shaping, by curing the resulting composition or "prepolymer" to provide a polymer which is infusible and insoluble in organic solvents. Most frequently, the composition in prepolymer stage is stored for subsequent use. Depending upon the initial composition thereof, the extent of the reaction and the type of application envisaged, the prepolymer, at ambient temperatures, is either a more or less viscous resin or is a powder having a more or less elevated softening point. Since the reaction is most typically carried out in the presence of an excess of bis-imide, relative to the stoichiometry of the addition reaction, it frequently results that a portion of the bis-imide which has not yet taken part in the polymerization reaction crystallizes in the admixture upon cooling, thus giving rise to a heterogeneous composition. In particular in the case of resins which are fluid at moderate temperatures, this phenomenon represents a major disadvantage to the user, who must then heat the resin until the bis-imide melts (generally at above 100° C.), in order to be able to use the resin, and this prevents their use at moderate temperature. Furthermore, certain applications require resins which are fluid at relatively low temperature.

SUMMARY OF THE INVENTION

Accordingly, a major object of the present invention is the provision of improved, storage-stable thermosetting compositions comprising the bis-imides, which compositions are not only homogeneous at ambient temperatures, but which also are not subject to recrystallization of the excess bis-imide in the prepolymer.

Another object of the invention is the provision of an improved process for the preparation of such thermosetting compositions comprising the bis-imides, which compositions are useful at ambient temperatures or relatively low temperatures and which display no tendency to crystallize after prolonged periods of storage.

Briefly, the above and other objects of the invention are attained via preparation of the subject thermosetting compositions, which are homogeneous at ambient temperatures, by intimately admixing/heating, to 50°–150° C., a mixture comprising:

(i) at least one bis-imide having the structural formula:

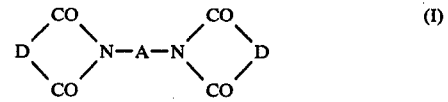

in which D represents

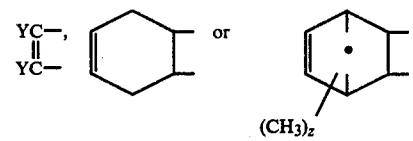

in which Y represents H, $CH_3$ or Cl and z is equal to 0, 1 or 2, and A represents the radical

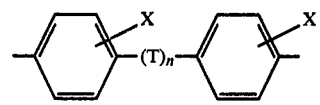

in which T represents $-CH_2-$, $-C(CH_3)_2-$, $-O-$, $-S-$, $-SO_2-$, $-N=N-$ or

n is 0 or 1 and x is zero, a $CH_3$ group or a halogen atom; and (ii) at least one other comonomer, other than an imide, copolymerizable therewith, said intimate admixing/heating, or prepolymerization, being characterized in that the reaction is carried out in the presence of an effective amount of N,N'-toluene-bis-maleimide such as to preclude the crystallization of the bis-imide of the formula (I) therefrom.

DETAILED DESCRIPTION OF THE INVENTION

More particularly according to the invention, the N,N'-toluene-bis-maleimide can be N,N'-(4-methyl-m-phenylene-bis-maleimide, N,N'-(2-methyl-m-phenylene)-bis-maleimide, or a mixture of both isomers.

In particular, the bis-imide of the formula (I) can be: N,N'-4,4'-biphenylene-bis-maleimide, N,N'-4,4'-diphenylmethane-bis-maleimide, N,N'-4,4'-diphenylmethane-bis-tetrahydrophthalimide, N,N'-4,4'-(diphenyl ether)-bis-maleimide, N,N'-4,4'-(diphenyl sulfide)-bis-maleimide, N,N'-4,4'-(diphenyl sulfone)-bis-maleimide, N,N'-4,4'-(1,1-diphenylcyclohexane)-bis-maleimide, N,N'-4,4'-diphenylmethane-bis-citraconimide, N,N'-4,4'-(diphenyl ether)-bis-endomethylenetetrahydrophthalimide, N,N'-4,4'-diphenylmethane-bis-chloromaleimide, N,N'-4,4'-(1,1-diphenylpropane)-bis-maleimide and N,N'-4,4'-(3,3'-dichlorodiphenylmethane)-bis-maleimide.

N,N'-4,4'-Diphenylmethane-bis-maleimide is preferred from among the aforenoted bis-imides.

It is of course possible to employ a mixture of the aforesaid diphenylene-bis-imides, or a mixture containing one or more of such diphenylene-bis-imides in association with different polyimides, such as N,N'-alkylene-bis-imides, and/or monoimides. If a mixture comprising a monoimide is used, the number of imide groups provided by the monoimide does not represent more than 30% of the total number of imide groups provided by the mixture of polyimides+monoimides.

The comonomers which can be copolymerized with the bis-imides of the formula I contain unsaturated double bonds of the vinyl, allyl or acrylic type, or coreactive groups such as —OH, —$NH_2$ or —NCO. The process according to the invention is not limited to any particular comonomer and is applicable to all cases where the N,N'-diphenylene-bis-imide crystallizes, on cooling, at an intermediate stage in the preparation of the thermosetting resin, thus imparting a heterogeneous structure. However, the process offers a very particular advantage for the preparation of solventless casting resins which can be used at ambient temperature or moderate temperature and have a viscosity of 1,000 to 100 poises at 20°–50° C., depending upon the ultimate composition. In the case of these resins, the recrystallization of the bis-imide of the formula (I) can occur after a few hours or a few days, depending upon its preparation.

Exemplary of resins of this type which possess valuable properties, after curing, are those resins obtained by copolymerization among N-vinylpyrrolidin-2-one, acrylamide and ethylenically unsaturated comonomers having a degree of reactivity such that the value of the resonance parameter Q is between 0.01 and 0.7 and the value of the polarity parameter e is less than or equal to 0, and also those resins obtained by reaction with an hydroxylated organopolysiloxane. Such resins and various processes for the preparation thereof are described, for example, in Belgian Pat. No. 846,365, corresponding to U.S. Pat. Nos. 4,111,919 and 4,173,595 and British Pat. No. 1,516,445; Belgian Pat. No. 876,616, corresponding to British Pat. No. 2,022,103; and Belgian Pat. No. 876,617, corresponding to British Pat. No. 2,021,597 and published French Patent Application No. 79/17,213.

Of course, the compositions can also comprise, as typical adjuvants, various compounds known to those skilled in this art, which make it possible to modify the behavior and the characteristics of the final products. These adjuvants are described in general terms in the above-mentioned patents. Such compounds include, in particular: aromatic compounds possessing 2 to 4 benzene rings, which do not sublime at atmospheric pressure up to 250° C. and which have a boiling point above 250° C., unsaturated polyesters and/or unsaturated monomers possessing double bonds of the maleic, vinyl, acrylic and allyl types, which make it possible to obtain more fluid ternary resins, and also the typical polymerization inhibitors and/or accelerators, and fillers, dyestuffs and pigments, and the like.

The amount of tolylene-bis-maleimide which, according to the invention, enables prevention of the crystallization of the N,N'-diphenylene-bis-imides in the thermosetting mixtures in which they are present can vary and depends on the nature of the bis-imide and of the copolymerizable monomer or monomers. Surprisingly, it appears that, in certain cases, the addition of as little as 1%, relative to the total weight of the mixture of the constituents, makes it possible to obtain a composition which is homogeneous at ambient temperature.

In general terms, the temperature used for the preparation of a homogeneous liquid composition ranges from 50° C. to 150° C. The order in which the constituents are added is not critical. It is possible to add the toluene-bis-maleimide to the mixture of the various constituents or to melt the imide derivatives together, before adding them to the copolymerizable monomers.

As above indicated, the process according to the invention offers the very particular advantage of preparation of resins which are fluid and homogeneous at ambient or moderate temperatures, and which can be utilized in solventless casting operations, this being suitable, in particular, for encapsulation uses in the electronics field and/or for the impregnation either of fabrics or mats of mineral fibers (glass, carbon and the like) for subsequent lamination, or for rovings for the manufacture of shaped articles by filament winding. After curing under the influence of heat at temperatures between 100° and 250° C., the mechanical and thermal properties of the resulting polymers are not adversely affected by the addition of the toluene-bis-maleimide.

In order to further illustrate the present invention and the advantages thereof, the following specific examples are given, at being understood that some are intended only as illustrative and in nowise limitative.

EXAMPLE 1

74 g of N,N'-4,4'-diphenylmethane-bis-maleimide, 1 g of N,N'-toluene-bis-maleimide, 12.5 g of N-vinyl-pyrrolidin-2-one, and 12.5 g of a polyester resin comprising 40% of allyl phthalate and 60% of a polyester prepared from maleic acid, trans-nadic acid, propylene glycol and ethylene glycol, were homogenized, by melting in a reactor equipped with a stirrer. The mixture was stirred at 115° C. for 30 minutes. The resulting composition, the viscosity of which was less than 2 poises was cooled to ambient temperature. This provided a translucent limpid solution. No recrystallization was observed after storage for 40 days.

By way of comparison, a composition prepared under the same conditions, but without including the toluene-bis-maleimide, had the appearance of an opaque wax, N,N'-4,4'-diphenylmethane-bis-maleimide having recrystallized during cooling.

EXAMPLE 2

The procedure described in Example 1 was repeated using 40 g of N,N'-4,4'-diphenylmethane-bis-maleimide, 10 g of N,N'-toluene-bis-maleimide, 12.5 g of N-vinylpyrrolidin-2-one and 37.5 g of the polyester resin described in said Example 1. The resin obtained after cooling to ambient temperature was a limpid solution. No recrystallization was observed upon storage for one month.

EXAMPLE 3

30.5 g of N,N'-4,4'-diphenylmethane-bis-maleimide, 10.5 g of N,N'-toluene-bis-maleimide and 9 g of 2,2,4-trimethylhexamethylene-bis-maleimide were homogenized by melting. 12.5 g of N-vinylpyrrolidin-2-one and 3.75 g of the polyester resin described in Example 1 were added thereto. The mixture was stirred for 30 minutes at 120° C. to provide a homogeneous liquid composition. After cooling, the composition was translucent and had a viscosity of 500 poises at 20° c. No recrystallization was observed after storage for 2 months at ambient temperature. The gelling time was 71 minutes at 150° C. and 20 minutes at 170° C.

A resin prepared under the same conditions, but without the toluene-bis-maleimide, crystallized within a few days after its preparation.

EXAMPLE 4

Example 3 was repeated, but 46 g of N,N'-4,4'-diphyenylmethane-bis-maleimide, 16 g of N,N'-toluene-bis-maleimide, 13 g of N,N'-hexamethylene-bis-maleimide, 12.5 g of N-vinylpyrrolidin-2-one and 12.5 g of the polyester resin were used. The viscosity of the resulting resin was 100 poises at 60° C. and 10 poises at 80° C. The gelling time was 43 minutes at 150° C. and 13 minutes at 170° C.

A resin prepared under the same conditions, but without the toluene-bis-maleimide, crystallized rapidly at ambient temperature.

EXAMPLE 5

9 g of N,N'-4,4'-diphenylmethane-bis-maleimide, 6 g of N,N'-toluene-bis-maleimide, 15 g of allyl phthalate and 30 g of the dimethylacrylic acid ester of oxyethyleneated bisphenol A, in the presence of 60 mg of tetrachloro-parabenzoquinone, were homogenized, by melting, in a reactor equipped with a stirrer. The mixture was stirred at 115° C. for one hour. The resulting composition, the viscosity of which was about 1 poise, was cooled to ambient temperature. This provided a translucent limpid solution. No recrystallization was observed after storage of 21 days.

By way of comparison, a composition prepared under the same conditions, but without the toluene-bis-maleimide, had the appearance of an opaque wax, N,N'-4,4'-diphenylmethane-bis-maleimide having recrystallized during cooling.

EXAMPLE 6

30.5 g of N,N'-4,4'-diphenylmethane-bis-maleimide, 10.5 g of N,N'-toluene-bis-maleimide were homogenized by melting. 9 g of 2,2,4-(trimethyl)hexamethylene-bismaleimide, 50 g of a dihydroxylic methylphenylpolysiloxane oil (having a viscosity of 1,000 poises and an OH content of about 7% by weight) and 0.6 g of benzimidazole were added thereto. The mixture, was maintained at 150° C. for 5 minutes, was a homogeneous liquid. After cooling, the composition was translucent and remained homogeneous, without recrystallization at ambient temperature.

The viscosity was about 5,000 poises at 25° C.

EXAMPLE 7

7.5 g of N,N'-4,4'-diphenylether-bis-maleimide, 7.5 g of N,N'-toluene-bismaleimide 3.75 g of N-vinyl pyrrolidin-2-one and 11.25 g of the polyester resin described in Example 1 were homogenized by melting. The mixture was stirred for 20 minutes at 138°–140° C. The composition was cooled to ambient temperature and was a translucent viscous solution. No recrystallization was observed after storage for 24 days.

EXAMPLE 8

Example 7 was repeated, using 10.5 g of N,N'-4,4'-diphenylether-bis-maleimide, 4.5 g of N,N'-toluene-bis-maleimide, 3.75 g of N-vinyl-pyrrolidine-2-one and 11.25 g of the same polyester resin. The resin obtained after cooling to ambient temperature was a translucent viscous solution. No recrystallization was observed after storage for 24 days.

By way of comparison, a composition prepared under the same conditions, but without the toluene-bis-maleimide crystallized during cooling.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. In a thermosetting composition, homogeneous at ambient temperature, and comprising the prepolymerization product obtained by reacting (i) an N,N'-diphenylene-bis-imide with (ii) at least one non-imido comonomer copolymerizable therewith, the improvement which comprises, as storage-stabilizer therefor, (iii) a bis-imide recrystallization preventing amount of an N,N'-tolylene-bis-maleimide.

2. The composition of matter as defined by claim 1, said N,N'-diphenylene-bis-imide having the structural formula:

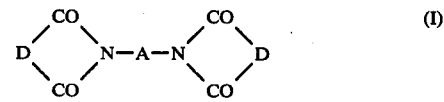

in which D represents

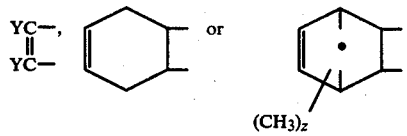

in which Y represents H, CH₃ or Cl and z is equal to 0, 1 or 2, and A represents the radical

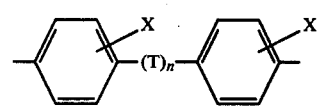

in which T represents —CH₂—, —C(CH₃)₂—, —O—, —S—, —SO₂—, —N=N— or

n is 0 or 1 and X is zero, a CH₃ group or a halogen atom.

3. The composition of matter as defined by claim 2, said bis-imide having the structural formula (I) being N,N'-4,4'-diphenylmethane-bis-maleimide.

4. The composition of matter as defined by claim 1, further comprising an N,N'-alkylene-bis-imide, a monoimide, or mixtures thereof.

5. The composition of matter as defined by claims 1 or 4, said copolymerizable comonomer comprising vinyl, allyl or acrylic unsaturation.

6. The composition of matter as defined by claim 4, said copolymerizable comonomer being N-vinylpyrrolidin-2-one.

7. The composition of matter as defined by claim 2, further comprising, as an adjuvant therefor, an aromatic compound having 2 to 4 benzene rings which cannot be sublimed and having a boiling point above 250° C., an unsaturated polyester, or mixture thereof.

8. A process for the preparation of the thermosetting composition as defined by claim 1, comprising heating an intimate admixture of the said components (i), (ii) and (iii) to a temperature ranging from about 50° to 150° C.

9. The composition of matter as defined by claim 1 or 2, further comprising at least one adjuvant for decreasing viscosity, polymerization inhibitor, polymerization accelerator, filler, dyestuff, pigment or mixture thereof.

10. A coating/impregnating formulation comprising the composition of matter as defined by claim 1.

11. A casting formulation comprising the composition of matter as defined by claim 1.

* * * * *